United States Patent [19]

Dietz et al.

[11] Patent Number: 5,071,483

[45] Date of Patent: Dec. 10, 1991

[54] PROCESS FOR THE PREPARATION OF PIGMENT PREPARATIONS OF THE ANTHANTHRONE SERIES

[75] Inventors: Erwin Dietz, Kelkheim; Manfred Urban, Wiesbaden; Siegfried Schiessler, Bad Soden am Taunus, all of Fed. Rep. of Germany

[73] Assignee: Hoechst Aktiengesellschaft, Frankfurt am Main, Fed. Rep. of Germany

[21] Appl. No.: 409,522

[22] Filed: Sep. 19, 1989

[30] Foreign Application Priority Data

Sep. 21, 1988 [DE] Fed. Rep. of Germany ....... 3832064

[51] Int. Cl.$^5$ .................... C09B 67/50; C08K 5/00
[52] U.S. Cl. ................................. 106/498; 106/499; 106/411; 106/412; 106/413; 106/506
[58] Field of Search ............... 106/499, 506, 411, 496, 106/413, 412

[56] References Cited

U.S. PATENT DOCUMENTS

| | | | |
|---|---|---|---|
| 3,973,981 | 8/1976 | Miyatake et al. | 106/496 |
| 4,018,791 | 4/1977 | Spietschka et al. | |
| 4,310,359 | 1/1982 | Ehashi et al. | 106/496 |
| 4,432,796 | 2/1984 | Santimauro | |
| 4,705,572 | 11/1987 | Spietschka et al. | |

FOREIGN PATENT DOCUMENTS 2197461  2/1986  Japan .
1463141  2/1977  United Kingdom .

OTHER PUBLICATIONS

Fiat Final Report, 1313 vol. II., p. 90.

Primary Examiner—William R. Dixon, Jr.
Assistant Examiner—C. Melissa Bonner

[57] ABSTRACT

A process for the preparation of pigment preparations of the anthanthrone series, which comprises subjecting anthanthrone crude pigments to aqueous pearl milling in the presence of dispersants of the formulae $$Q_1-[A_1-X]_n \quad (I)$$

and/or

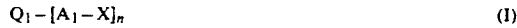

$$[Q_2-A_2]_z-Y \quad (II)$$

in which in formula (I) $Q_1$ is the radical of an anthanthrone, azo, isoindolinone, diketopyrrolopyrrole or perinone compound, $A_1$ is a direct bond or —O—, —S—, —NR$_3$, —CO—, —SO$_2$—, —CR$_4$R$_5$— or arylene, X is a group

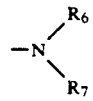

or a heterocyclic radical having at least one nitrogen atom, and R$_3$, R$_4$, R$_5$, R$_6$ and R$_7$ are hydrogen atoms or saturated or unsaturated alkyl groups and n is 1 to 4, and in formula (II) $Q_2$ is a radical of the formula

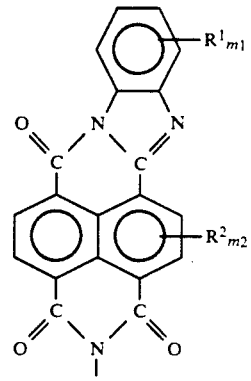

in which R$_1$ is hydrogen, halogen, alkyl, alkoxy or cyano, or, in the case that m$_1$>1, R$_1$ can also be a combination of these substituents, R$_2$ is hydrogen, halogen, an alkyl, alkoxy or cyano or, in the case that m$_2$>1, R$_2$ can also be a combination of these substituents, m$_1$ and m$_2$ are 1 to 4, A$_2$ is —(CH$_2$)$_p$—, CR$_8$R$_9$—, arylene, —O—, —NR$_{10}$—, —CO— or —SO$_2$—, in which p is from 1 to 6, R$_8$, R$_9$ and R$_{10}$ are hydrogen or alkyl, Y is dimethylamino or diethylamino or an imidazole or piperazine radical and z is 1 or 2, and subjecting the suspensions of the prepigment preparations obtained to a heat treatment at temperatures from 20° to 200° C.

11 Claims, No Drawings

PROCESS FOR THE PREPARATION OF PIGMENT PREPARATIONS OF THE ANTHANTHRONE SERIES

DESCRIPTION

The present invention relates to a particularly non-polluting and economical process for the preparation of pigment preparations which are distinguished by excellent coloristic and rheological properties, such as dispersibility, resistance to flocculation, rheology, gloss behavior and color strength. They are used for pigmenting high-molecular-weight materials, in particular varnish systems. Of the anthanthrone derivatives, 4,10-dibromoanthanthrone in particular has obtained great industrial importance as a pigment. The preparation of the crude pigment is described in Fiat Final Report 1313 Vol. page 90 II. It is prepared by cyclizing 8,8,-dicarboxy-1,1,-dinaphthyl in sulfuric acid monohydrate to the anthanthrone, which is then brominated. The 4,10-dibromoanthanthrone thus obtained is then precipitated as the sulfate by the addition of small amounts of water and is isolated. Hydrolysis liberates the 4,10-dibromoanthanthrone crude pigment therefrom.

To convert this crude pigment into a pigment form various methods of conversion into a finely divided form have been disclosed:

1. German Patent No. 2,540,739 describes the conversion of the crude pigment into a finely divided form by dissolving it in concentrated acids and subsequent precipitation by pouring the solution into water. The conversion into a finely divided form is followed by a treatment with cetyltrimethylammonium bromide. The pigments thus obtained have only moderate color strength. In addition, large amounts of dilute sulfuric acid are formed which have to be regenerated.

2. European Patent No. 0,075,182 describes a method in which the conversion of the crude pigment into a finely divided form is effected by treatment with polyphosphoric acid and subsequent hydrolysis, which can be followed by a variety of known finishing processes. The pigments prepared by this method have only low color strength. This method is very expensive since the large amounts of dilute phosphoric acid formed have to be reprocessed.

3. U.S. Pat. No. 4,705,572 describes a method in which the conversion of the crude pigment into a finely divided form is carried out by revatting. The conversion is followed by a solvent finish. It is true that pigments of high color strength are obtained, but the amounts of salt formed in the revatting lead to effluent problems. Due to the high costs of chemicals, this method is uneconomical.

4. U.S. Pat. No. 4,018,791 describes the purification of the crude pigment via the sulfate and subsequent milling in a liquid medium. This gives pigments of high color strength if the crude pigments obtained after the synthesis are converted to the sulfate with the 25-fold amount of concentrated sulfuric acid, the sulfate is isolated, the pure product is liberated by hydrolysis of the sulfate, and the product is separated off and milled in a liquid medium. The pigments obtained by this method show unsatisfactory rheological behavior upon incorporation in paints. This is caused by extensive flocculation of the pigment, which, in addition, leads to poor gloss in the applied paint and to a high viscosity of the milled material. The large amounts of approximately 70 - 80% sulfuric acid formed have to be regenerated. In addition, extremely long milling times are required and for this reason only a low space-time yield is achieved. For these reasons, this method is very expensive and uneconomical. The pigments obtained do not meet today's requirements.

In contrast, it has been found that pigment preparations of the anthanthrone series can be prepared without any ecological problems and at low cost by subjecting the anthanthrone crude pigments formed after the synthesis to aqueous pearl milling in the presence of pigment dispersants of the general formulae $$Q_1-[A_1-X]_n \text{ and/or } [Q_2-A_2]_z-Y \qquad (II)$$

in which in formula (I) $Q_1$ is the radical of an anthanthrone azo, isoindolinone, diketopyrrolopyrrole or perinone compound, $A_1$ is a direct bond or a divalent group from the series consisting of —O—, —S—, —NR$_3$—, —CO—, —SO$_2$—, —CR$_4$R$_5$— and arylene, for example phenylene or naphthylene, or a chemically reasonable combination of these divalent groups, X is a group

or a heterocyclic radical having at least one nitrogen atom, for example an imidazole or piperazine radical, and $R_3$, $R_4$, $R_5$, $R_6$ and $R_7$ are hydrogen atoms or saturated or unsaturated $C_1$-$C_4$-alkyl groups, and n is an integer from 1–4, in formula (II) $Q_2$ is a radical of the general formula

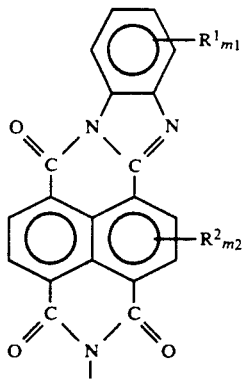

in which $R_1$ is a hydrogen or halogen atom or a $C_1$-$C_4$-alkyl, $C_1$-$C_4$-alkoxy or cyano group, or, in the case that $m_1 > 1$, $R_1$ can also be a combination of these substituents, $R_2$ is a hydrogen or halogen atom or a $C_1$-$C_4$-alkyl, $C_1$-$C_4$-alkoxy or cyano group or, in the case that $m_2 > 1$, $R_2$ can also be a combination of these substituents, $m_1$ and $n_2$ are numbers from 1 to 4, $A_2$ is a divalent group from the series consisting of —(CH$_2$)$_p$—, CR$_8$R$_9$—, arylene, —O—, —NR$_{10}$—, —CO— or —SO$_2$— or a chemically reasonable combination of these divalent groups, in which p is a number from 1 to 6, $R_8$, $R_9$ and $R_{10}$ are hydrogen atoms or saturated or unsaturated $C_1$-$C_4$-alkyl groups, Y is a dimethylamino or diethylamino group or an imidazole or piperazine radical and z is the number 1 or 2, and subjecting the suspensions of the prepigment preparations obtained without or after isolation of the intermediate to a heat treatment in the presence or absence of an organic solvent at temperatures from about 20° to about 200° C.

The pigment preparations thus obtained are distinguished by excellent coloristic and rheological properties. In particular crude pigments prepared via the oxonium sulfate and having a mean particle size of $>5\,\mu$ are suitable for the aqueous pearl milling. Preferably, the moist, coarsely crystalline crude pigments formed after the synthesis according to the Fiat Report are used. The milling medium is preferably water. However, it can also contain water-miscible solvents.

Preference is given to the use of basic pigment dispersants of the general formula

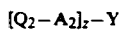

$$[Q_2-A_2]_z-Y$$

in which the radical $Q_2$ is unsubstituted ($R^1=R^2=H$), Y is a dimethylamino or diethylamino group or an imidazole or piperazine radical and z is the number 1 or 2.

The pigment dispersants mentioned are used in amounts of about 0.1 to 25 % by weight, preferably about 1 to about 10% by weight, relative to the crude pigment. It is also possible to use mixtures of pigment dispersants of the general formula (I) and/or (II) mentioned. Anion-active, cation-active or nonionic surface-active substances can also be added.

Suitable mills for the milling are batchwise or in particular continuous stirred ball mills which have a horizontal, vertical, cylindrical or annular milling compartment. The milling is usually carried out at 0° to 100° C., preferably 10° to 50° C. Preferably, balls having a diameter of 0.3 to 3 mm and consisting of quartz, alumina, zirconium oxide or mixed oxides are used as milling medium. The finely divided prepigment preparation present after the milling is subjected to a heat treatment in aqueous suspension or after the addition of organic solvents (finishing).

Examples of solvents which are suitable for the finishing process are:

Alkanols ($C_1-C_{10}$), such as methanol, ethanol, propanol, n-or i-butanol, $C_1-C_6$-dialkyl or cyclic ketones, such as, for example, dimethyl ketone, diethyl ketone, methyl ethyl ketone, cyclohexanone, ethers and glycol ethers, such as, for example, the monomethyl or monoethyl ether of glycol, ethyl diglycol, methoxybutanol, aromatic hydrocarbons, such as, for example, toluene, xylenes or ethylbenzene, aromatic chlorinated hydrocarbons, such as, for example, chlorobenzene, o-dichlorobenzene, 1,2,4-trichlorobenzene or bromobenzene, aromatic nitrocompounds, such as, for example, nitrobenzene or nitrophenol, aliphatic carboxamides, such as, for example, formamide or dimethylformamide, cyclic carboxamides, such as, for example, N-methyl pyrrolidone, $C_1-C_4$-alkyl $C_1-C_4$-carboxylates, such as, for example, butyl formate, ethyl acetate or propyl propionate, or $C_1-C_4$-alkyl benzoates, such as, for example, ethyl benzoate, or heterocyclic bases, such as, for example, pyridines, morpholine, picoline and dimethyl sulfoxide and sulfolane.

Preferred organic solvents are alkanols, such as, for example, ethanol, propanol, butanols and pentanols or aromatic hydrocarbons, such as, for example, xylenes, ethylbenzene and cumene. The solvent finish can vary within wide limits depending on the desired properties of the pigment preparation. The suspension of the prepigment preparation is usually treated at a temperature of about 50° to about 200° C. for up to 24 hours. The amount of solvent can vary within wide limits. Preferably, the same to 5-fold amount by weight of solvent, relative to the prepigment preparation, is used.

The treatment in the aqueous organic medium is preferably carried out at about 80° to about 150° C. for 1 to 6 hours. After the finishing process is completed, the solvents are recovered and used again. Preferably, the suspension of the prepigment preparation obtained after the milling is used without an interisolation. Depending on the intended use, the prepigment preparations obtained by the process according to the invention can be converted into a more hiding or transparent form, which can be adjusted via the dissolving capacity of the solvent, the concentration, the temperature and the duration of the treatment.

The pigment preparations according to the invention are suitable for the pigmenting of high-molecular-weight natural or synthetic organic materials, such as, for example, cellulose ethers and esters, such as ethyl cellulose, nitrocellulose, cellulose acetate, cellulose butyrate, natural resins or synthetic resins, such as polymerization resins or condensation resins, for example amino resins, in particular urea- and melamineformaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures. It is not crucial whether these high-molecular-weight organic compounds mentioned are present as plastic materials, as melts or in the form of spinning solutions, varnishes, coatings or printing inks. Depending on the intended use, it is found to be advantageous to employ the pigments to be used according to the invention as toners or in the form of preparations or dispersions. Relative to the high-molecular-weight organic material to be pigmented, the pigments prepared according to the invention are used in an amount of preferably 0.1 to 10 % by weight.

The pigment preparations prepared by the process according to the invention are particularly suitable for use in baking enamel systems, for example in alkyd-melamine resin lacquers and acrylic-melamine resin lacquers, two-component lacquer systems based on polyisocyanate-crosslinkable acrylic resins and aqueous lacquer systems. After their incorporation, pure and bright coatings of high color strength and very good weatherfastness are obtained. The pigment preparations thus prepared have very good flow properties in modern lacquer systems, even at high pigment concentrations, in combination with excellent resistance to flocculation. If pigment dispersants based on naphthoylenebenzimidazole dicarboxylic acid and bis-(3-aminopropyl)-piperazine are used, pigment preparations having excellent overspray fastness in all conventional lacquer systems are obtained.

The preparation of these pigment preparations by the process claimed takes place without any waste products, with few chemicals and with solvents which are further processed or are recycled completely. For these reasons, this process is particularly economical and non-polluting.

To evaluate the properties of the pigment preparations claimed in lacquer systems, from the large number of known systems, an alkyd-melamine resin lacquer (AM6) based on a medium-oil non-drying alkyd resin consisting of synthetic fatty acids and phthalic anhydride and a melamine resin etherified with butanol and portions of a non-drying alkyd resin based on ricinenic acid (short-oil) and an acrylic resin stoving enamel based on a nonaqueous dispersion (TSA-AND) were selected. In the examples below, they are referred to under the name AM6 and TSA-AND.

The rheology of the milled material after the dispersion (millbase rheology) is evaluated by means of the following five-step scale:

| 5 | highly fluid |
|---|---|
| 4 | fluid |
| 3 | viscous |
| 2 | slightly set |
| 1 | set |

After dilution of the milled material to the pigment concentration, the viscosity was evaluated by means of the "Viscospatula" of Rossmann, type 301, from ERICHSEN.

Gloss measurements were carried out at an angle of 20° according to DIN 67530 (ASTMD 523) by means of a multigloss glossimeter from BYK-MALLINCKRODT.

In the examples below, parts and percentages are by weight. The unsubstituted radical $Q_2$ which often occurs in the examples and has the formula V

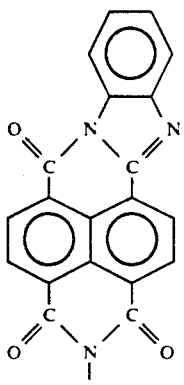

(V) (Q')

is abbreviated to Q'.

EXAMPLE 1

78 g of 4,10-dibromoanthanthrone crude pigment in the form of a moist presscake are stirred in 130 ml of water. 2.0 g of pigment dispersant of the formula

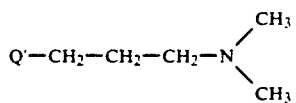

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 79.3 g of pigment preparation. The testing in AM6 lacquer gives yellowish-red coatings of high color strength. The millbase rheology (15%) has a rating of 4 and the gloss a rating of 80.

If the pigment dispersant is omitted in the preparation of the pigment preparation, a pigment is obtained whose millbase viscosity has a rating of 1 and whose gloss is 64. The color strength of the pigment is 13% less than that of the pigment preparation. The pigment obtained from the same crude pigment in accordance with U.S. Pat. No. 4,018,791, example 9, has a millbase rheology of 1. The gloss has a rating of 8.

EXAMPLE 2

78 g of 4,10-dibromoanthanthrone crude pigment in the form of a moist pressed cake are stirred in 130 ml of water. 4.0 g of pigment dispersant of the formula

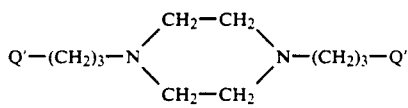

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 80.8 g of pigment preparation. The testing in AM6 lacquer gives yellowish-red coatings of high color strength. The millbase rheology (15%) has a rating of 4 and the gloss a rating of 81.

The viscosity of the 5% full tone lacquer is 2.6". Without pigment dispersant, the viscosity is 4.1". The pigment has a higher color strength than the pigment obtained by example 1.

EXAMPLE 3

78 g of 4,10-dibromoanthanthrone crude pigment in the form of a moist pressed cake are stirred in 130 ml of water. 4.0 g of pigment dispersant of the formula

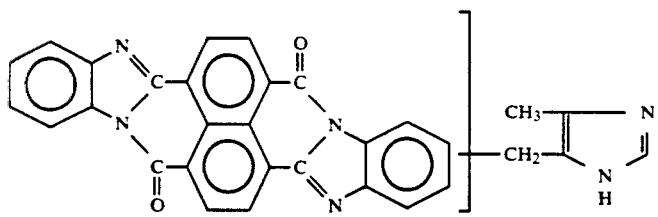

are added to the suspension, and the mixture is stirred for 15 minutes. This suspension is then poured into a pearl mill of the type Drais PM1 which is filled with 1,600 g of quartz beads of 1 mm in diameter, and the mixture is milled at 2,800 rpm for 2 hours. The milled material is then screened, and the quartz beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 81.3 g of pigment preparation. The testing in AM6 lacquer gives yellowish-red coatings of high color strength. The millbase rheology (15%) has a rating of 2 to 3 and the gloss a rating of 81.

EXAMPLE 4

78 g of 4,10-dibromoanthanthrone crude pigment in the form of a moist pressed cake are stirred in 130 ml of water. 1.6 g of pigment dispersant of the formula

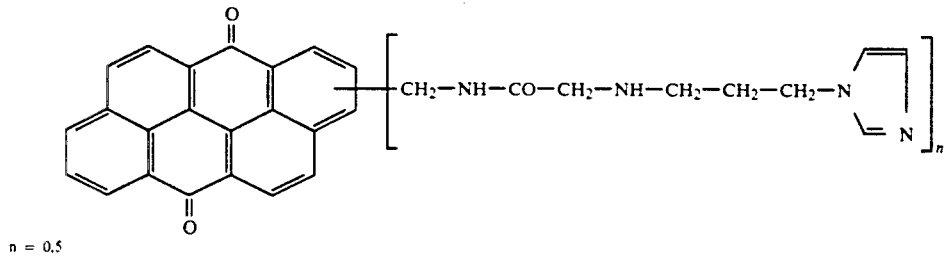

n = 0.5 are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 78.2 g of pigment preparation. The testing in AM6 lacquer gives yellowish-red coatings of high color strength. The millbase rheology (15%) has a rating of 2 to 3 and the gloss a rating of 78.

EXAMPLE 5

78 g of 4,10-dibromoanthanthrone crude pigment in the form of a moist pressed cake are stirred in 130 ml of water. 2.0 g of pigment dispersant of the formula

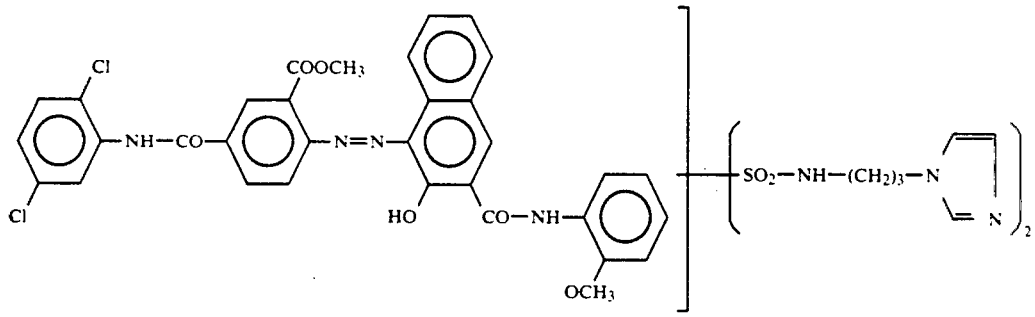

ing of 2 to 3 and the gloss a rating of 81.

isobutanol are then added, and the Isobutanol is then distilled off up to a temperature of 100° C. at the column head, and the product is filtered off with suction at 50° C., washed with water and dried at 80° C.

This gives 79 1 g of pigment preparation. The testing in AM6 lacquer gives yellowish-red coatings of high color strength. The millbase rheology (15%) has a rating of 4 and the gloss a rating of 81.

EXAMPLE 6

78 g of 4,10-dibromoanthanthrone crude pigment in the form of a moist pressed cake are stirred in 130 ml of water. 2.0 g of pigment dispersant of the formula

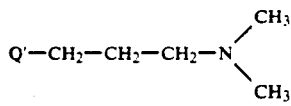

and 2.0 g of pigment dispersant of the formula

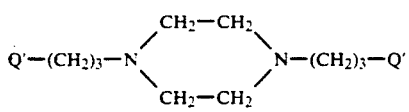

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 81.7 g of pigment preparation. The testing in AM6 lacquer gives yellowish-red coatings of high color strength. The millbase rheology (15%) has a rating of 4 and the gloss a rating of 83.

The pigment has higher color strength than the pigment obtained according to example 1.

EXAMPLE 7

78 g of 4,10-dibromoanthanthrone crude pigment in the form of a moist pressed cake are stirred in 130 ml of water. 6.0 g of pigment dispersant of the formula

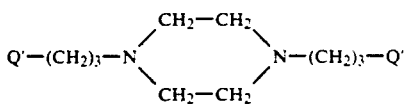

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at the boiling point for 3 hours. Isobutanol is then distilled off up to a temperature of 100° C. at the column head, and the product is filtered off with suction at 50° C., washed with water and dried at 80° C.

This gives 82.5 g of pigment preparation. The testing in AM6 lacquer gives yellowish-red coatings of high color strength. The millbase rheology (15%) has a rating of 3 to 4 and the gloss a rating of 84.

The pigment is more transparent and has higher color strength than the pigment obtained according to example 2.

EXAMPLE 8

78 g of 4,10-dibromoanthanthrone crude pigment in the form of a moist pressed cake are stirred in 130 ml of water. 4.0 g of pigment dispersant of the formula

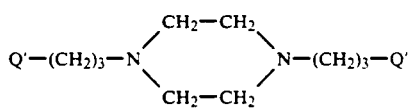

are added to the suspension, and the mixture is stirred for 15 minutes. This suspension is then poured into a pearl mill of the type Drais PM1 which is filled with 1,600 g of zirconium oxide beads of 0.6 to 1 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of 100% pure isobutanol are then added, and the mixture is heated at 150° C. for 3 hours. The mixture is allowed to cool to 90° C., isobutanol is then distilled off up to a temperature of 100° C. at the column head, and the product is filtered off with suction at 50° C., washed with water and dried at 80° C.

This gives 79.3 g of pigment preparation. The testing in AM6 lacquer gives yellowish-red coatings of high color strength. The millbase rheology (15%) has a rating of 3 to 4 and the gloss a rating of 82.

The pigment is somewhat more hiding than the pigment obtained according to example 1.

EXAMPLE 9

78 g of 4,10-dibromoanthanthrone crude pigment in the form of a moist pressed cake are stirred in 130 ml of water. 4.0 g of pigment dispersant of the formula

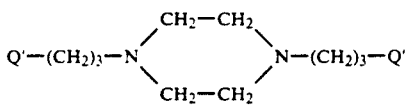

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 400 g of 100% pure isobutanol are then added, and the mixture is heated at 150° C. for 3 hours. The mixture is allowed to cool to 90° C., isobutanol is then distilled off up to a temperature of 100° C. at the column head, and the product is filtered off with suction at 50° C., washed with water and dried at 80° C.

This gives 80.9 g of pigment preparation. The testing in AM6 lacquer gives yellowish-red coatings of high color strength. The millbase rheology (15%) has a rating of 3 to 4 and the gloss a rating of 83.

EXAMPLE 10

78 g of 4,10-dibromoanthanthrone crude pigment in the form of a moist pressed cake are stirred in 130 ml of water. 4.0 g of pigment dispersant of the formula

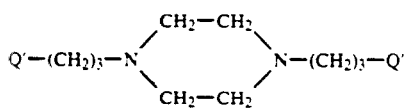

are added to the suspension, and the mixture is stirred for 15 minutes. This suspension is then poured into a pearl mill of the type Drais PM1 which is filled with 1,600 g of zirconium oxide beads of 1 to 1.5 mm in diameter, and the mixture is milled at 2,800 rpm for 2 hours. The milled material is then screened, and the zirconium oxide beads are rinsed with water. The suspension of the prepigment preparation is filtered off with suction, and the solid is washed with water. The filter cake is then stirred together with such an amount of water that the weight of the suspension is 580 g. 80 g of xylene are then added, and the mixture is heated at the boiling point for 3 hours. Xylene is then distilled off up to a temperature of 100° C. at the column head, and the product is filtered off with suction at 50° C., washed with water and dried at 80° C.

This gives 80.1 g of pigment preparation. The testing in AM6 lacquer gives yellowish-red coatings of high color strength. The millbase rheology (15%) has a rating of 3 to 4 and the gloss a rating of 82.

The pigment is more hiding than the pigment obtained according to example 1.

EXAMPLE 11

2 kg of 4,10-dibromoanthanthrone crude pigment in the form of the moist presscake are stirred in 10 l of water. 102 g of the pigment dispersant of the formula

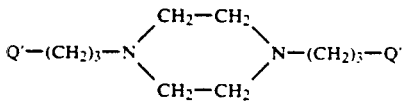

are added to the suspension, and the mixture is stirred for 15 minutes. The suspension is then milled in a continuous stirred ball mill which is filled with zirconium oxide beads of 1 to 1.5 mm in diameter in 4 passages at 20° to 30° C. During the milling, small amounts of water are added from time to time to maintain optimum milling conditions. 139 g of isobutanol are then added to 1000 g of this suspension of milled material, and the mixture is heated at the boiling point for 3 hours. Isobutanol is then distilled off up to a temperature of 100° C.

at the column head, and the product is filtered off with suction at 50° C., washed with water and dried at 80° C.

This gives 79.3 g of pigment preparation. The testing in AM6 lacquer gives yellowish-red coatings of high color strength. The millbase rheology (15%) has a rating of 4 and the gloss a rating of 80.

We claim:

1. A process for the preparation of pigment preparations of the anthanthrone series, which comprises subjecting anthanthrone crude pigments to aqueous pearl milling in the presence of pigment dispersants of the general formulae $$Q_1-[A_1-X]_n \text{ or } [Q_2-A_2]_z-Y \qquad (II)$$

or mixtures thereof, in which in formula (I) $Q_1$ is the radical of an anthanthrone, azo, isoindolinone, diketopyrrolopyrrole or perinone compound, $A_1$ is a direct bond or a divalent group from the series consisting of $-O-$, $-S-$, $-NR_3-$, $-CO-$, $-SO_2-$, $-CR_4R_5-$ and arylene or a combination of divalent groups selected from the group consisting of $-(CH_2)_p-$, $-NR_{10}-$, $-CO-$, $-SO_2-$, X is a group

or a heterocyclic radical having at least one nitrogen atom, and $R_3$, $R_4$, $R_5$, $R_6$ and $R_7$ are hydrogen atoms or saturated or unsaturated $C_1-C_4$-alkyl groups and n is an integer from 1 to 4, and in formula (II) $Q_2$ is a radical of the general formula

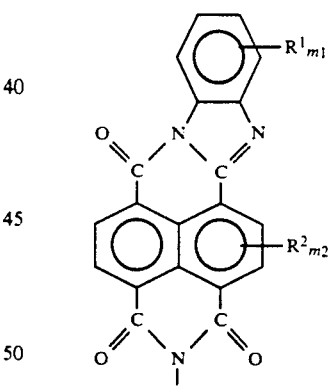

in which $R_1$ is a hydrogen or halogen atom or a $C_1-C_4$-alkyl, $C_1-C_4$-alkoxy or cyano group, or, in the case that $m_1 > 1$, $R_1$ can also be a combination of these substituents, $R_2$ is a hydrogen or halogen atom or a $C_1-C_4$-alkyl, $C_1-C_4$-alkoxy or cyano group or, in the case that $m_2 > 1$, $R_2$ can also be a combination of these substituents, $m_1$ and $m_2$ are numbers from 1 to 4, $A_2$ is a divalent group from the series consisting of $-(CH_2)_p-$, $CR_8R_9-$, arylene, $-O-$, $-NR_{10}-$, $-CO-$ or $-SO_2-$ or a combination of these divalent groups, in which p is a number from 1 to 6, $R_8$, $R_9$ and $R_{10}$ are hydrogen atoms or saturated or unsaturated $C_1-C_4$-alkyl groups, Y is a dimethylamino or diethylamino group or an imidazole or piperazine radical and z is the number 1 or 2, and subjecting the suspensions of the prepigment preparations obtained to a heat treatment in the presence or absence of an organic solvent at temperatures from about 20° C. to about 200° C.

2. The process as claimed in claim 1 wherein anthanthrone crude pigments having a particle size of >5 μm are used.

3. The process as claimed in claim 1, wherein pigment dispersants of the general formula (II) mentioned in claim 1 are used, in which $Q_2$ is the radical

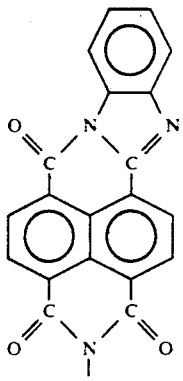

Y is a dimethylamino or diethylamino group or an imidazole or piperazine radical and z is the number 1 or 2.

4. The process as claimed in claim 1, wherein pigment dispersants of the formula

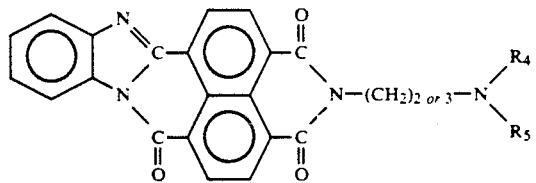

in which $R_4$ and $R_5$ are $C_1$-$C_4$-alkyl groups or together with the nitrogen atom form a heterocycle are used.

5. The process as claimed in claim 1, wherein pigment dispersants of the formula

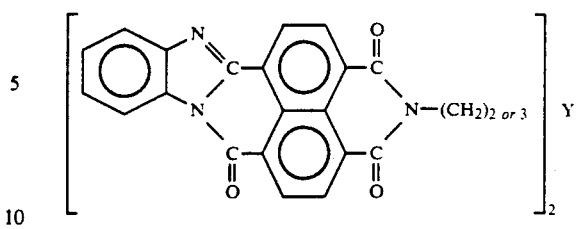

in which Y is a piperazine radical are used.

6. The process as claimed in claim 1, wherein mixtures of pigments dispersants of the following formulae

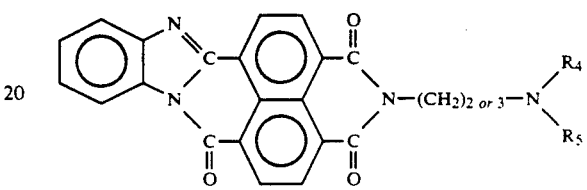

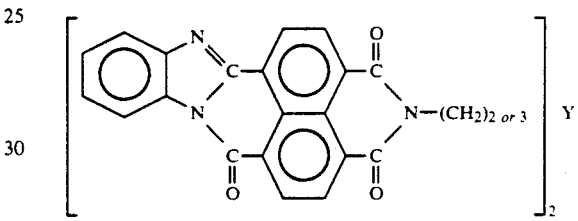

are used.

7. The process as claimed in claim 1, wherein the dispersants are added in an amount of about 1 to about 10 percent by weight, relative to the anthanthrone crude pigment.

8. The process as claimed in claim 1, wherein the aliphatic alcohols having 1 to 6 carbon atoms are used as the organic solvent for the heat treatment of the suspensions of the prepigment.

9. The process as claimed in claim 1, wherein the suspensions of the prepigment preparations are subjected without or after interisolation to a heat treatment in the presence or absence of an organic solvent at temperatures from about 80° to about 150° C.

10. The process as claimed in claim 1, wherein the suspensions of the prepigment preparations obtained after completed pearl milling of the anthanthrone crude pigments in the presence of pigment dispersants are transferred to a heat treatment in the presence of organic solvents without an interisolation.

11. The process as claimed in claim 1 wherein said suspensions of the prepigment preparations is first isolated as an intermediate.

* * * * *